US009845841B2

(12) United States Patent
Arnold et al.

(10) Patent No.: US 9,845,841 B2
(45) Date of Patent: *Dec. 19, 2017

(54) PROCEDURE FOR OPERATING A TRANSMISSION DEVICE (71) Applicant: ZF Friedrichshafen AG, Friedrichshafen (DE)

(72) Inventors: Jorg Arnold, Immenstaad (DE); Klaus Steinhauser, Kressbronn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 851 days.

This patent is subject to a terminal disclaimer.

(21) Appl. No.: 14/177,261

(22) Filed: Feb. 11, 2014

(65) Prior Publication Data

US 2014/0230588 A1    Aug. 21, 2014

(30) Foreign Application Priority Data

Feb. 20, 2013 (DE) .................. 10 2013 202 709

(51) Int. Cl.
*F16H 3/02* (2006.01)
*F16H 61/04* (2006.01)
(Continued)

(52) U.S. Cl.
CPC ............ *F16H 3/02* (2013.01); *F16H 61/0403* (2013.01); *F16H 3/66* (2013.01); *F16H 61/686* (2013.01);
(Continued)

(58) Field of Classification Search
CPC ........ F16H 61/12; F16H 61/68; F16H 61/682; F16H 61/0403; F16H 2061/0474
(Continued)

(56) References Cited

U.S. PATENT DOCUMENTS 5,036,729 A * 8/1991 Nitz ...................... B60W 30/18
477/148
6,109,407 A * 8/2000 Bockmann .......... F16H 61/0213
192/3.63
(Continued)

FOREIGN PATENT DOCUMENTS

DE        103 61 299 A1    7/2005
DE   10 2005 002 337 A1    8/2006
(Continued)

OTHER PUBLICATIONS

German Search Report Corresponding to 10 2013 202 709.5 dated Oct. 7, 2013.
(Continued)

*Primary Examiner* — William C Joyce
(74) *Attorney, Agent, or Firm* — Davis & Bujold PLLC; Michael J. Bujold (57) ABSTRACT A method of operating a transmission which is shifted to various operating conditions by engaging shifting elements. At least one of the shifting elements is an interlocking shifting element which has to be engaged to obtain at least one defined operating condition of the transmission during which force flows between an input and an output shaft. When a command is received to engage the interlocking shifting element, a rotational speed of the transmission input shaft is displaced in the direction toward a synchronous rotational speed produced in the engaged operating condition of the interlocking shifting element at least as a function of the rotational speed of the transmission output shaft. When the variation of the rotational speed of the transmission input shaft crosses a predefined rotational speed threshold, the interlocking shifting element is actuated in its engaging direction.

9 Claims, 4 Drawing Sheets (51) Int. Cl.
*F16H 3/66* (2006.01)
*F16H 3/44* (2006.01)
*F16H 61/686* (2006.01)

(52) U.S. Cl.
CPC .......... *F16H 2003/442* (2013.01); *F16H 2061/0474* (2013.01); *F16H 2200/0065* (2013.01); *F16H 2200/201* (2013.01); *F16H 2200/2046* (2013.01); *F16H 2200/2064* (2013.01); *F16H 2200/2094* (2013.01); *Y10T 74/19251* (2015.01)

(58) Field of Classification Search
USPC .......................................................... 74/335
See application file for complete search history.

(56) References Cited

U.S. PATENT DOCUMENTS

| | | | | |
|---|---|---|---|---|
| 6,308,125 | B1* | 10/2001 | Gleason | B60W 10/06 701/53 |
| 6,883,394 | B2* | 4/2005 | Koenig | F16H 61/2807 74/330 |
| 7,789,792 | B2 | 9/2010 | Kamm et al. | |
| 7,827,876 | B2* | 11/2010 | Guggolz | F16H 59/68 74/335 |
| 8,398,522 | B2 | 3/2013 | Bauknecht et al. | |
| 8,777,807 | B2* | 7/2014 | Schneider | F16H 61/0403 477/174 |
| 2010/0044183 | A1* | 2/2010 | Guggolz | B60W 10/02 192/219 |
| 2011/0263382 | A1* | 10/2011 | Arnold | F16H 61/0403 477/121 |
| 2011/0301819 | A1* | 12/2011 | Arnold | F16H 61/0403 701/51 |
| 2013/0253788 | A1 | 9/2013 | Arnold et al. | |
| 2013/0268168 | A1 | 10/2013 | Arnold et al. | |

FOREIGN PATENT DOCUMENTS

| | | |
|---|---|---|
| DE | 10 2005 054 767 A1 | 5/2007 |
| DE | 10 2008 000 429 A1 | 9/2009 |
| DE | 10 2009 056 793 A1 | 6/2011 |
| DE | 10 2010 063 024 A1 | 6/2012 |
| DE | 10 2010 063 027 A1 | 6/2012 |
| DE | 10 2010 063 029 A1 | 6/2012 |

OTHER PUBLICATIONS

German Search Report Corresponding to 10 2013 202 710.9 dated Oct. 21, 2013.
German Search Report Corresponding to 10 2013 202 711.7 dated Oct. 14, 2013.

\* cited by examiner

Fig. 1

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | |

PROCEDURE FOR OPERATING A TRANSMISSION DEVICE

This application claims priority from German patent application serial no. 10 2013 202 709.5 filed Feb. 20, 2013.

FIELD OF THE INVENTION

The invention concerns a method for operating a transmission device.

BACKGROUND OF THE INVENTION

A transmission device designed as an 8-gear multi-stage transmission with frictional shifting elements such as disk clutches and disk brakes is known from DE 10 2005 002 337 A1. When a shift is demanded for a gear ratio change in the transmission device, at least one frictional shifting element, which is engaged in the force flow of the transmission device to obtain the actual gear currently engaged in the transmission device, has to be disengaged from the force flow of the transmission device, whereas at least one other frictional shifting element, which is disengaged from the force flow of the transmission device while the current, actual gear is engaged in the transmission device, has to be engaged in the force flow of the transmission device in order to obtain the target gear required.

During this, with increasing shift duration the torque transmitted by the frictional shifting element engaged in the force flow in order to obtain the gear currently engaged in the transmission device is transferred to a greater or lesser extent to the frictional shifting element that has to be engaged in the force flow of the transmission device in order to obtain the target gear required, whereas the torque that can be transmitted by the shifting element to be disengaged decreases.

Disadvantageously, frictional shifting elements in the open operating condition generate drag torques which impair the overall efficiency of an automatic transmission to an undesired extent.

For that reason transmission devices such as that known from DE 10 2008 000 429 A1 are increasingly often made, besides frictional shifting elements, also with interlocking shifting elements in the area of which no drag torques that impair the overall efficiency of a transmission device occur.

In that case, however, it must be borne in mind that only when they are close to their synchronous point can interlocking shifting elements be shifted from an open operating condition in which no torque can be transmitted by the interlocking shifting element, to their closed operating condition in which all of the torque applied can be transmitted by the interlocking shifting element. Furthermore, interlocking shifting elements engaged in the force flow of a transmission device can only be disengaged from the force flow with small shifting forces when they are close to their load-free operating condition.

When a command is given to close an interlocking shifting element by acting upon it with an appropriate closing force, then on the part of an electric control unit or by software means, the shift command is issued with a certain lead time before the synchronous point of the interlocking shifting element has been reached, which the interlocking shifting element must be at when the target gear is engaged. This is intended to ensure that the actual engagement process or interlocking of the interlocking shifting element takes place within a predetermined speed difference window between the two halves of the shifting element, within which the probability is high that the interlocking shifting element can be engaged. In addition, the lead time allows for system-inherent delays caused for example by signal propagation times, hydraulic reaction delays and/or the component travel path to be covered in order to establish the connection. In this context the lead time to be allowed, particularly in the case of hydraulically actuated interlocking shifting elements of transmission devices such as automatic transmissions, depends to an appreciable extent also on the operating temperature of the transmission device or the temperature of the transmission oil.

The lead time to be allowed in each case for initiating the closing process of the interlocking shifting element can for example be determined empirically. Moreover, the lead time can also be determined as a function of the currently existing gradient of the rotational speed variation of a transmission input shaft or a rotational speed equivalent thereto, such as a turbine rotational speed or the like, before reaching the synchronous point of the interlocking shifting element that determines the time when the interlocking shifting element can be engaged, and the actuation of the interlocking shifting element can be specified accordingly.

For the calculation of gradients of rotational speed variations in most cases several rotational speed values are used because of signal noise, in order to avoid erroneous control commands. However, as a result of this procedure it is possible, for example, that substantial rotational speed changes cannot be recognized promptly by virtue of gradients determined in this manner, since the complex calculation methods used for the avoidance of errors in each case delay the perception of changes.

If the closing process of an interlocking shifting element is not started in good time before the synchronous point of the interlocking shifting element is reached, the attempt to close the interlocking shifting element takes place while the rotational speed difference between the two halves of the interlocking shifting element is still too large. The interlocking shifting element cannot then be changed to its closed operating condition and it is also possible that damage may occur in the area of the interlocking shifting element if the shifting element halves to be brought into interlocked engagement with one another in fact only make contact in the area of their ends facing toward one another, and the abrasion that occurs during this can impair the function of the interlocking shifting element.

SUMMARY OF THE INVENTION

Accordingly, the purpose of the present invention is to provide a method for operating a transmission device, by means of which damage in the area of interlocking shifting elements, caused because of closing processes that have not been initiated at the proper time, can be avoided in a simple manner.

According to the invention, this objective is achieved by a method having the characteristics discussed below.

In the method according to the invention for operating a transmission device, in particular a 9-gear transmission that can be shifted to various operating conditions by the actuation of shifting elements, wherein at least one of the shifting elements is in the form of an interlocking shifting element which, to obtain at least one defined operating condition of the transmission device during which a force flow exists between a transmission input shaft and a transmission output shaft, has to be changed to its closed operating condition, when the closing of the interlocking shifting element is commanded, a rotational speed of the transmission input shaft or a rotational speed equivalent thereto is displaced in the direction toward a synchronous rotational speed which, in the closed operating condition of the interlocking shifting element, is determined at least as a function of the rotational speed of the transmission output shaft.

To avoid damage in the area of an interlocking shifting element that has to be closed, the engagement process of the interlocking shifting element starting from its open operating condition is discontinued if the rotational speed variation of the transmission input shaft or the variation of the rotational speed equivalent thereto crosses a predefined rotational speed threshold after reaching the synchronous rotational speed when the interlocking shifting element is already being actuated in its closing direction.

As is known, a required closing process of an interlocking shifting element outside the rotational speed difference window which allows meshing between the shifting element halves can most probably not be carried out to the desired extent, and it may be that irreversible damage occurs in the area of the interlocking shifting element during an unsuccessful closing attempt.

If the transmission input rotational speed or the rotational speed equivalent thereto reaches the predefined rotational speed threshold, then it is assumed that the interlocking shifting element cannot be changed to its closed operating condition to the desired extent and the engagement process is accordingly discontinued in order, in a simple manner, to avoid a defective shifting process.

In an advantageous variant of the method according to the invention, a timer is started when the variation of the rotational speed of the transmission input shaft or the rotational speed equivalent thereto, after reaching the synchronous rotational speed while the interlocking shifting element is being actuated in its closing direction, crosses a further predefined rotational speed threshold before the predefined rotational speed threshold, and the engagement process of the interlocking shifting element starting from its open operating condition is discontinued if the timer value reaches a predefined level. By virtue of this procedure it is again ensured that in the case of low gradients of the variation of the rotational speed of the transmission input shaft or of a rotational speed difference between the shifting element halves of the interlocking shifting element to be closed, undesirably lengthy engagement processes without successful closing of the interlocking shifting element are terminated already before reaching the additional predefined rotational speed threshold that constitutes a criterion for discontinuation, so that on the one hand damage in the area of the interlocking shifting element is avoided and on the other hand an undefined, intermediate operating condition of a transmission device lasts only for a limited time.

In a further advantageous variant of the method according to the invention, the engagement process is discontinued if, before reaching the synchronous speed, the rotational speed variation of the transmission input shaft or the rotational speed equivalent thereto crosses an additional predefined rotational speed threshold without an actuation of the interlocking shifting element in its closing direction having been called for. In a simple manner this avoids damage in the area of an interlocking shifting element that is to be closed, since the engagement process of the interlocking shifting element is discontinued if the closing of the interlock connection has not yet been called for by the transmission control unit or by software means up to a defined rotational speed difference in the area of the interlocking shifting element, before the synchronous operating condition of the interlocking shifting element has been reached.

In a further advantageous variant of the method according to the invention, a time point before reaching the synchronous rotational speed is determined, beyond which an actuation of the interlocking shifting element in its closing direction should be started, whereas the engagement process of the interlocking shifting element is discontinued if the variation of the rotational speed of the transmission input shaft or of the rotational speed equivalent thereto crosses the additional predefined rotational speed threshold at a point in time that is earlier than the time determined for the beginning of the interlocking shifting elements actuation in its closing direction. This procedure ensures that engagement or closing processes of an interlocking shifting element which, depending on the operating condition, have clearly been started too late and cannot therefore be completed to the desired extent with low component loading, are discontinued in good time.

If the interlocking shifting element is actuated in its closing direction when the variation of the rotational speed of the transmission input shaft or that of the rotational speed equivalent thereto crosses an additional further predefined rotational speed threshold, reaching the rotational speed of the transmission input shaft or the rotational speed equivalent thereto before the additional predefined rotational speed threshold value, a so-termed forced engagement of the not previously actuated interlocking shifting element is initiated in order to engage the interlocking shifting element to the required extent and again in order to avoid too late an actuation of the shifting element and the resulting damage to the interlocking shifting element.

Once the engagement process of the interlocking shifting element has been discontinued the transmission device is changed to a safe operating condition in which both the transmission input shaft and the transmission output shaft are free to rotate. In this way safety-critical operating conditions such as a blocked drive output in a vehicle made with the transmission device operated according to the invention, are avoided in a simple manner.

In a preferred variant of the method according to the invention, the safe operating condition of the transmission device corresponds to a neutral operating condition in which the force flow between the transmission input shaft and the transmission output shaft is interrupted, and in which, for that, all the shifting elements of the transmission device are preferably changed to their open operating condition.

Alternatively, the safe operating condition corresponds to the operating condition of the transmission device before the command to close the interlocking shifting element was issued.

If the rotational speed threshold, the further rotational speed threshold, the additional rotational speed threshold and/or the additional further rotational speed threshold are varied as a function of an operating temperature of the transmission device, than damage in the area of an interlocking shifting element can be avoided with little effort over the full operating range of the transmission device.

In addition or alternatively, the rotational speed threshold, the further rotational speed threshold, the additional rotational speed threshold and/or the additional further rotational speed threshold can be varied as a function of a gradient of the variation of the difference between the current rotational speed of the transmission input shaft and the synchronous rotational speed of the transmission input shaft or of a rotational speed equivalent thereto, in order to avoid damage in the area of an interlocking shifting element that is to be closed, in a manner adapted to the operating condition variation existing at the time.

BRIEF DESCRIPTION OF THE DRAWINGS

Further advantages and advantageous further developments of the invention emerge from the example embodiments whose principle is described with reference to the drawing, which shows.

DETAILED DESCRIPTION OF THE PREFERRED EMBODIMENTS

Figure 1:
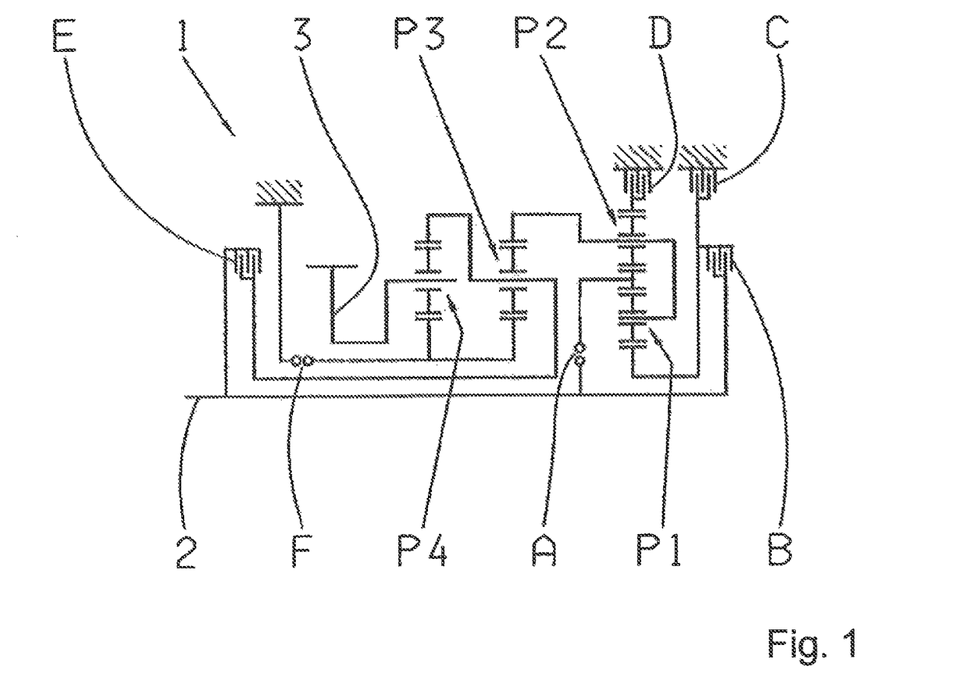
FIG. 1: A gearset layout of a transmission device.

FIG. 1 shows a gear layout of a transmission device 1, namely a 9-gear transmission which is in essence known from DE 10 2008 000 429 A1. The transmission device 1 comprises a drive input shaft 2 and a drive output shaft 3, the latter being connected when the transmission device is mounted in a vehicle to a drive output of the vehicle, whereas the drive input shaft 2 is functionally connected to a drive machine.

Furthermore, the transmission device 1 comprises four planetary gearsets P1 to P4, such that the first and second planetary gearsets P1, P2, which are preferably designed as minus planetary gearsets, form a shiftable upstream gearset whereas the third and fourth planetary gearsets P3 and P4 form the main gearset. In addition, the transmission device 1 comprises six shifting elements A to F of which the shifting elements C, D and F are brakes and the shifting elements A, B and E are shifting clutches.

Figure 2:
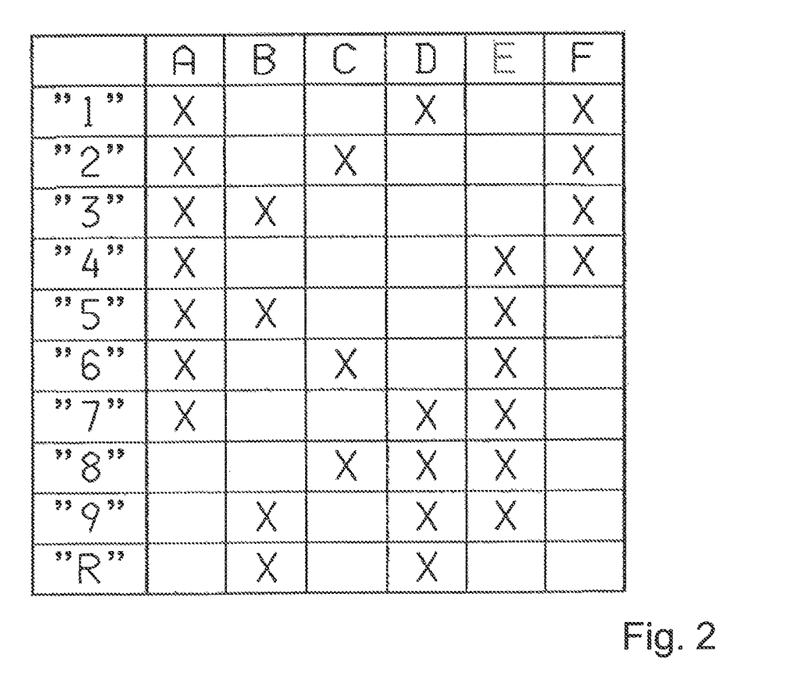
FIG. 2: A table showing the shifting logic of the transmission device according to FIG. 1.

In accordance with the shifting logic shown in detail in FIG. 2, using the shifting elements A to F nine forward gears "1" to "9" and one reverse gear "R" can be engaged selectively, in such manner that to produce a force flow in the transmission device 1, in essence three shifting elements at a time have to be changed to or kept in a closed operating condition in each case.

In the present case, the shifting elements A and F are in the form of interlocking shifting elements without additional synchronization means in order, by comparison with transmission devices made only with frictional shifting elements, to reduce drag torques caused by open frictional shifting elements during the operation of the transmission device 1. Since interlocking shifting elements can generally only be changed from an open to a closed operating condition within a very narrow speed difference range around the synchronous rotational speed, the synchronization of an interlocking shifting element to be engaged without additional design and structural measures is achieved by appropriate actuation of the respective shifting elements involved in the gearshift. This applies to both traction and overdrive gearshifts, and the interlocking shifting elements can be designed as claw clutches made with or without additional synchronizing means.

Figure 3:
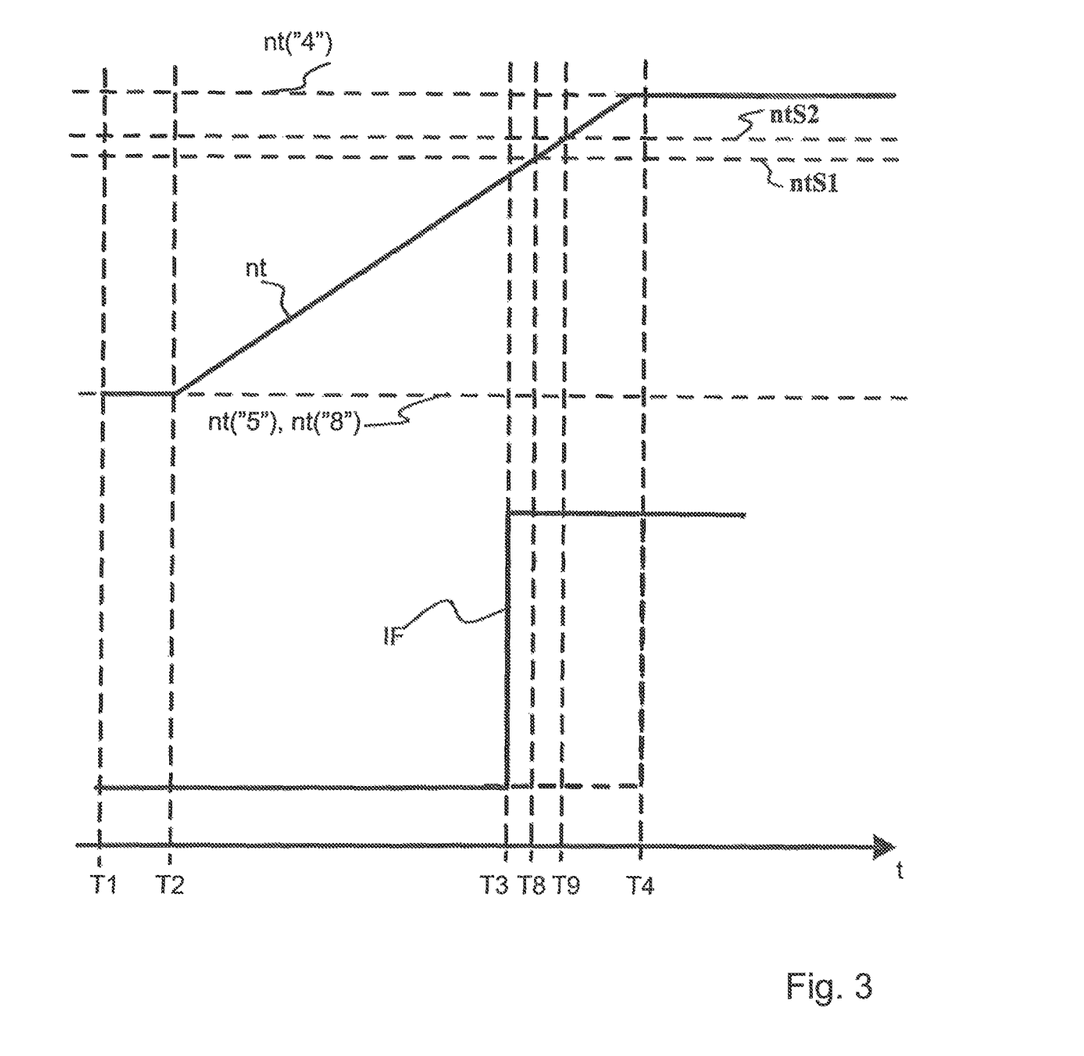
FIG. 3: A comparison of a number of variations of various operating condition parameters of the transmission device in FIG. 1, occurring in each case during a correctly carried out engagement process and during a correctly timed discontinuation of an engagement process of a not yet actuated interlocking shifting element.
Figure 4:
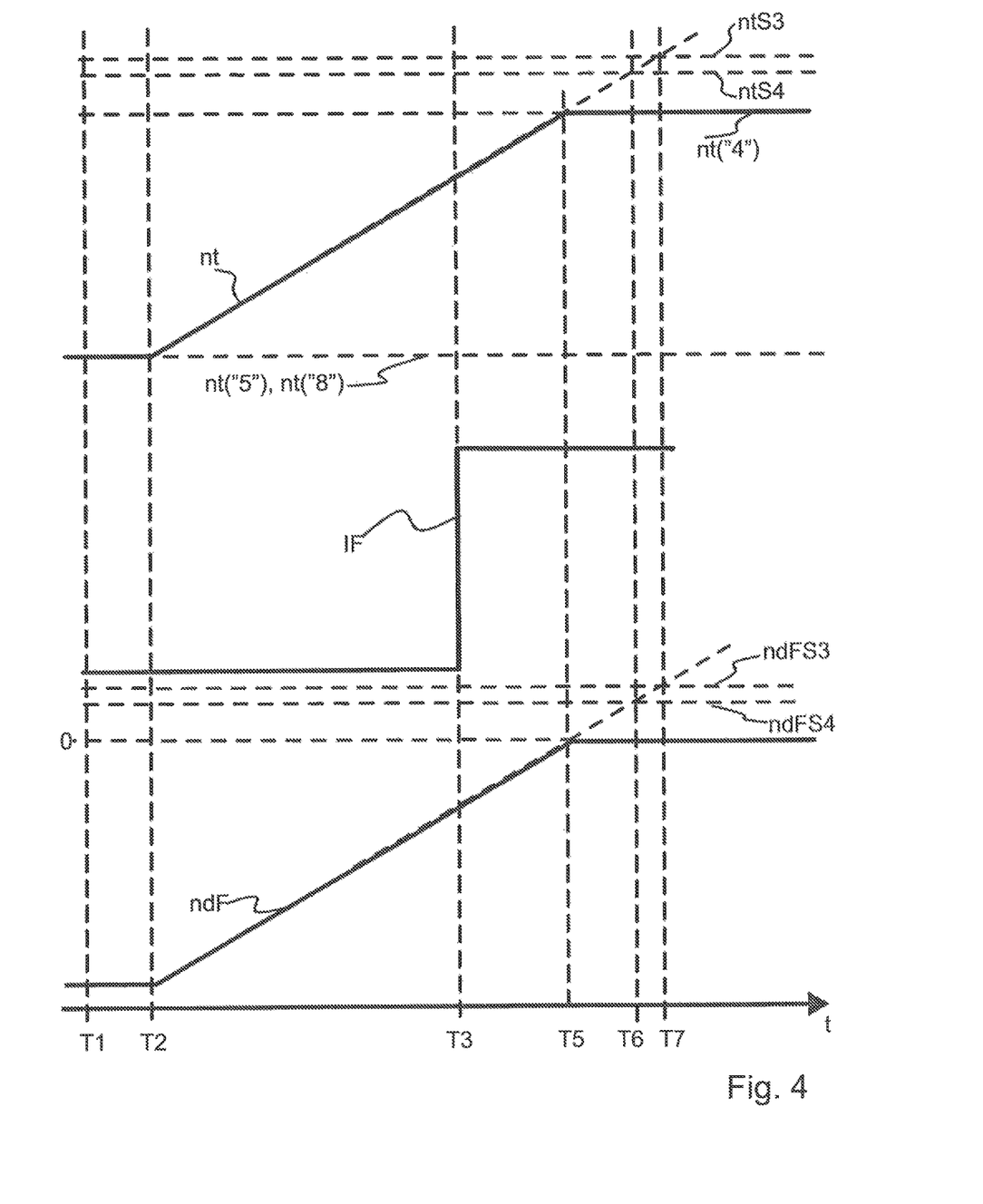
FIG. 4: A representation corresponding to FIG. 3, showing a number of variations of various operating condition parameters of the transmission device in FIG. 1 during an engagement process of an interlocking shifting element already being actuated in its closing direction, when a faulty closing process is recognized.
Figure 5:
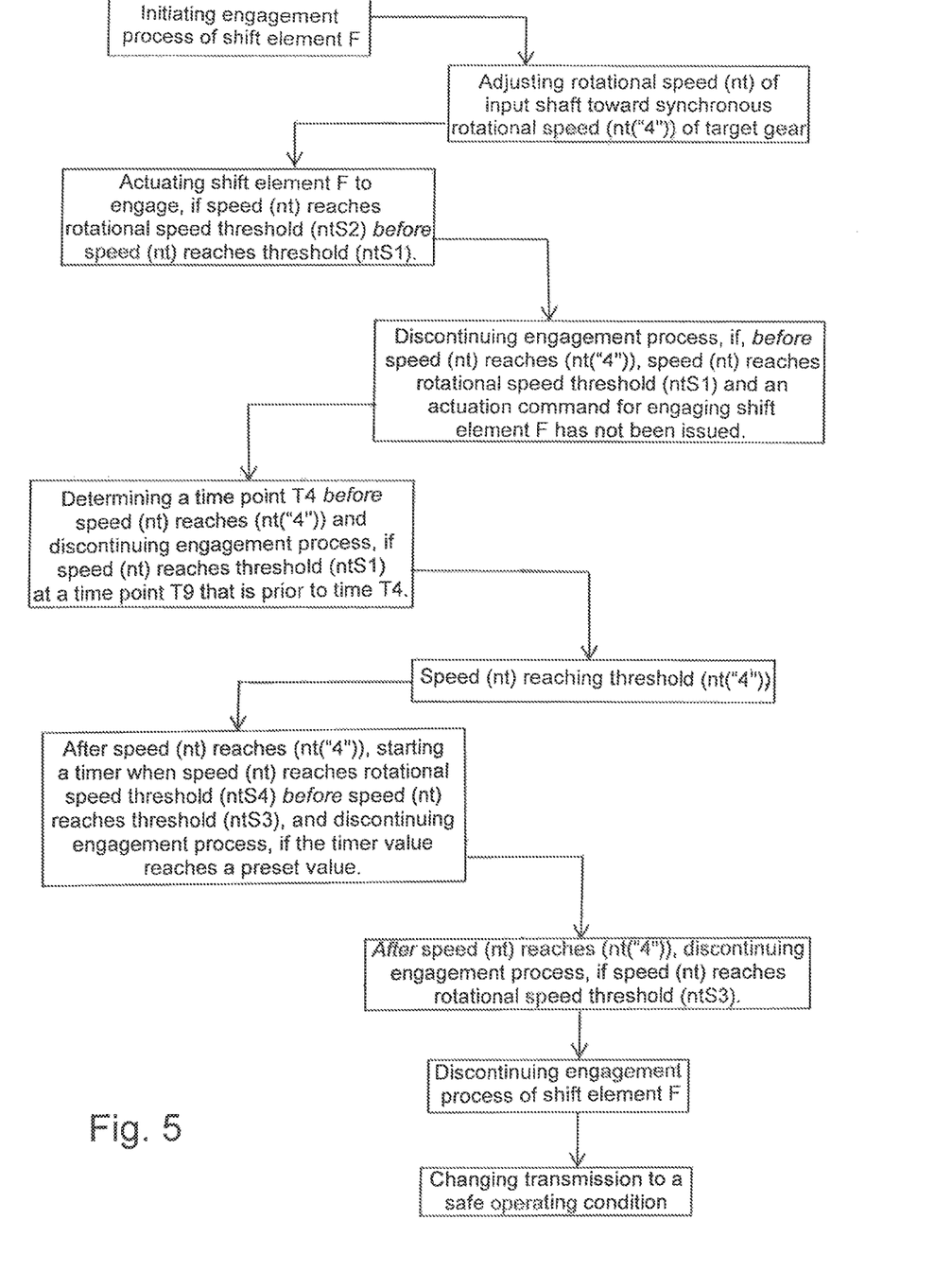
FIG. 5: A flow diagram of a method for operating a transmission device in FIG. 1 based on various operating condition parameters of the transmission.

The mode of action of the method according to the invention will now be explained in more detail with reference to the variations as a function of time t of a number of operating parameters of the transmission device 1, as represented in FIGS. 3 and 4. The method according to the invention can be used both for monitoring and actuating the interlocking shifting element F during a required gearshift starting from the fifth gear "5" toward the fourth gear "4", to carry out which the frictional shifting element B has to be disengaged and the interlocking shifting element F has to be engaged, and also for monitoring and actuating the interlocking shifting element A during a required gearshift starting from the eighth gear "8" toward the seventh gear "7", to carry out which the frictional shifting element C has to be disengaged and the interlocking shifting element A has to be engaged. Furthermore, the method according to the invention can also be suitably operated during operating condition variations in which, in the area of the transmission device 1, by closing the interlocking shifting element A and/or F a force flow in the form of a so-termed gear engagement is produced, as can be necessary for example at the end of a coasting operation phase of a vehicle fitted with the transmission device 1. In addition the method according to the invention can be used for operating condition variations during which an interlocking shifting element has to be changed from an open to a closed operating condition in order to carry out a required upshift.

Until a time point T1, the fifth gear "5" or the eighth gear "8" for forward driving is engaged in the transmission device 1. At time T1, a command is received for a gearshift starting from the currently engaged, actual gear "5" or "8" toward the fourth gear "4" or the seventh gear "7" for forward driving, respectively, namely the target gear in each case, for which purpose the frictional shifting element B or the frictional shifting element C has to be opened and at the same time the interlocking shifting element F or the interlocking shifting element A, respectively, has to be changed from its open to its closed operating condition.

At time T1, at which the frictional shifting element B or C is still fully closed and the interlocking shifting element F or A is fully open and the fifth gear "5" or the eighth gear "8", respectively, is engaged, a rotational speed nt of the transmission input shaft 2 corresponds to the respective synchronous rotational speed nt("5") or nt("8") existing in the transmission device 1 when the fifth gear "5" or the eighth gear "8" is engaged.

For simplicity the procedure according to the invention will be described in more detail below but essentially only for the interlocking shifting element F, granted that the sequence described corresponds to that also provided for the actuation and monitoring of the interlocking shifting element A during a required gearshift from the eighth gear "8" toward the seventh gear "7".

From a time point T2 later than T1, at which the command to shift from the actual gear "5" toward the target gear "4" has been received, the transmission capacity of the frictional shifting element B is reduced by a corresponding reduction of its actuating pressure, whereby the rotational speed nt of the transmission input shaft 2 increases toward the synchronous speed nt("4") existing when the fourth gear "4" is engaged in the transmission device 1. At the same time, namely at time T2 which represents the beginning of the downshift from the fifth gear "5" toward the fourth gear "4", the point in time before the synchronous speed nt("4") has been reached is determined, starting from which an actuation of the interlocking shifting element F in its closing direction should be initiated. In addition, the difference between the rotational speed of the transmission input shaft 2 and the synchronous rotational speed nt("4") is determined continuously.

At the time point T3 denotes the time, determined as a function of the operating condition, from which the interlocking shifting element F should be acted upon by the actuating force needed in order to close it, then at time T3 a variation of the control current IF of the interlocking shifting element F is abruptly increased in the manner shown in idealized form in FIG. 3 and the interlocking shifting element F is actuated to the extent desired.

If the time determined for beginning the actuation of the interlocking shifting element F is a later one, for example the time point T4, then the procedure according to the invention described below comes into play.

The time point T4 determined as the beginning of engagement at the same time represents the time point at which the control current IF is increased abruptly as indicated in FIG. 3 by the heavy broken line. At time T4, the rotational speed nt of the transmission input shaft 2 also fortuitously reaches the synchronous rotational speed nt("4"). Regardless of this, however, the engagement process of the interlocking shifting element F, which has not yet been actuated by the transmission control unit of the transmission device 1 in the closing direction, is discontinued on crossing a rotational speed threshold ntS1, which is lower than the synchronous rotational speed nt("4") and in the present case is crossed by the variation-line of the rotational speed nt of the transmission input shaft 2 at a time T8. The reason for this is that if the actuation of the interlocking shifting element begins at values of the rotational speed nt of the transmission input shaft 2 which are higher than the rotational speed threshold ntS1, the interlocking shifting element can no longer be engaged within the rotational speed difference window necessary for engagement between the shifting element halves of the interlocking shifting element F that have to be brought into interlock with one another when the interlocking shifting element is closed, so that the rotational speed threshold ntS1 represents a limit above which an actuation of the interlocking shifting element F in its closing direction no longer results in successful engagement.

Depending on the application concerned it is also possible for the interlocking shifting element F to be changed to its closed operating condition by means of a so-termed forced engagement. For this, a further rotational speed threshold ntS2 must be stored in the transmission control unit. When the rotational speed nt of the transmission input shaft 2 exceeds this rotational speed threshold ntS2, which in this case is lower than the first rotational speed threshold ntS1 and in the present case is crossed by the variation-line of the rotational speed nt of the transmission input shaft 2 at a time T9, the actuation of the interlocking shifting element F in its closing direction is started even though the time T4 has not yet been reached. In this case the second rotational speed threshold ntS2 is a rotational speed value of the transmission input shaft 2 starting from which a closing process that has already begun can most probably be carried out without causing damage in the area of the interlocking shifting element F.

This in turn means that in the absence of the forced engagement to be initiated in some circumstances by crossing the further rotational speed threshold ntS2, when the rotational speed threshold ntS1 is reached the actuation of the interlocking shifting element F in its closing direction is no longer initiated if it has not yet been started by then. Thus, the rotational speed threshold ntS1 constitutes a safety threshold for the further rotational speed threshold ntS2 in case, in turn, when the latter is exceeded this does not necessarily lead to starting the actuation of the interlocking shifting element in its closing direction, for example because of a fault.

In contrast, the operating condition variations shown in FIG. 4, which occur during a downshift of the transmission device 1 starting from the fifth gear "5" toward the fourth gear "4", are obtained if the actuation of the shifting element F has been started in good time by the electric transmission control unit and actuation is already taking place.

At time T1 a command is again received for the downshift from the fifth gear "5" toward the fourth gear "4" in the transmission device 1, so that at time T2 the frictional shifting element B is actuated as described in the case of FIG. 3 and its transmission capacity is reduced, in order to bring the rotational speed nt of the transmission input shaft 2, to the extent described earlier, from the synchronous speed nt("5") toward the synchronous speed nt("4") of the target gear. At time T3 the transmission control unit actuates the interlocking shifting element F in order to change it to its closed operating condition. At a time T5 the rotational speed nt of the transmission input shaft 2 corresponds to the synchronous rotational speed nt("4") of the target gear "4" to be engaged, but at time T5 the interlocking shifting element F is not yet in its closed operating condition. In addition, during the already started closing process of the interlocking shifting element F, i.e. after its actuation has begun, a rotational speed difference ndF between the two shifting element halves of the interlocking shifting element F that have to be brought together with interlock is continuously determined and monitored.

The rotational speed difference ndF has its maximum value between times T1 and T2. With progressive reduction of the transmission capacity of the frictional shifting element B the speed difference decreases progressively, and becomes essentially equal to zero at time T5. Since despite the actuation of the interlocking shifting element F having been started at T3 the interlocking shifting element F is not yet closed at T5, as the operating time t increases the rotational speed difference ndF increases in the direction of more positive values.

At a time T6, the rotational speed nt of the transmission input shaft 2 crosses a rotational speed difference threshold ntS4 and the rotational speed difference ndF that depends on it crosses a corresponding rotational speed threshold ndFS4, and a timer is started. As the operating time t continues increasing, the timer value is increased steadily or cyclically. If the timer reaches a predefined value before the interlocking shifting element has been closed completely, the engagement process of the interlocking shifting element F is discontinued and the transmission device is changed to a safe operating condition, preferably one in which all the shifting elements A to F are in their open operating condition.

If at a time T7 the rotational speed nt of the transmission input shaft 2 reaches a rotational speed threshold ntS3 or the rotational speed difference ndF reaches a rotational speed difference threshold ndFS3 before the timer has reached its predefined value, the crossing of the third rotational speed threshold ntS3 by the rotational speed nt of the transmission input shaft 2 or the crossing of the rotational speed difference threshold ndFS3 by the rotational speed difference ndF results in discontinuation of the engagement process of the interlocking shifting element F, since it is then recognized by virtue of the method according to the invention or by the monitoring function initiated by the downshift command that the rotational speed difference ndF in the area of the interlocking shifting element F has reached values too high to enable the required closing process of the interlocking shifting element F to be carried out properly.

By virtue of this procedure, in general a complete failure to mesh and also a brief meshing with subsequent disengagement in the area of an interlocking shifting element can be recognized, and thus damage or increased wear in the area of an interlocking shifting element not closed to the required extent can be avoided safely.

Once the closing process of the interlocking shifting element F has been discontinued, it is possible for the transmission device 1 to be changed directly or even indirectly, i.e. via an intermediate control measure, to an operating condition in which a gear is engaged in the transmission device 1, to obtain which the interlocking shifting element F is not involved. Furthermore, it is also possible for the transmission device 1 to be changed to an operating condition with no force flow through it, in which all the shifting elements A to F are open. In general, depending on the gearset system concerned in each case, it must be ensured that interlocking shifting elements can be changed to an open operating condition in opposition to any internally acting forces or torques when the safe operating condition, in which all the shifting elements should be in their open operating condition, has to be produced.

Depending on the application concerned, the rotational speed threshold ntS1, the rotational speed threshold ntS2, the rotational speed threshold ntS3 and/or the rotational speed threshold ntS4 can be varied as a function of the operating temperature of the transmission device 1 or of the transmission oil, by which means viscosity-related scatter in the control of the interlocking shifting element F can be reduced to the desired extent. In addition it is also possible to vary the rotational speed thresholds ntS1 and/or ntS2 as a function of a load borne by the transmission device and/or a gradient of the rotational speed nt of the transmission input shaft 2, in order to carry out the actuation of the interlocking shifting element F as a function of an operating condition variation existing at the time, or to discontinue the actuation when appropriate, and thereby to avoid long-lasting, undefined operating conditions of the transmission device 1 and prevent irreversible damage in the area of the interlocking shifting element F caused by a closing process that cannot be carried out because of the operating condition at the time.

| Indexes | |
|---|---|
| 1 | Transmission device |
| 2 | Drive input shaft |
| 3 | Drive output shaft |
| "1" to "9" | Forward driving gear |
| A to F | Shifting element |
| IF | Control current of the interlocking shifting element F |
| ndF | Rotational speed difference at the interlocking shifting element F |
| ndFS3, ndFS4 | Predefined rotational speed threshold |
| nt | Rotational speed of the transmission input shaft |
| nt("4"), nt("5"), nt("8") | Synchronous rotational speed |
| ntS1 to ntS4 | Predefined rotational speed threshold |
| "R" | Reversing gear |
| t | Time |
| T1 to T9 | Discrete time point |

The invention claimed is:

1. A method of operating a transmission device (1) which can be changed to various operating conditions by actuating shifting elements (A to F), at least one of the shifting elements (A, F) is a positively interlocking shifting element which, in order to obtain at least one of the various operating conditions of the transmission device (1) during which a force flow exists between a transmission input shaft (2) and a transmission output shaft (3), has to be changed to an engaged operating condition, the method comprising the steps of:

initiating an engagement process to engage the positively interlocking shifting element;

varying a rotational speed (nt) of the transmission input shaft (2) or a rotational speed of a component that is equivalent to the rotational speed of the transmission input shaft toward a synchronous rotational speed (nt ("4")) which is produced in the engaged operating condition of the positively interlocking shifting element (F), and the synchronous rotational speed being determined at least as a function of a rotational speed of the transmission output shaft (3);

after reaching the synchronous rotational speed (nt("4")), discontinuing the engagement process of the positively interlocking shifting element (F) from a disengaged operating condition, if the variation of the rotational speed (nt) of the transmission input shaft (2) or the rotational speed of the component that is equivalent to the rotational speed of the transmission input shaft equals a predetermined rotational speed threshold (ntS3); and after reaching the synchronous rotational speed, starting a timer when the variation of the rotational speed (nt) of the transmission input shaft (2) or the rotational speed of the component that is equivalent to the rotational speed of the transmission input shaft, equals a further predefined rotational seed threshold (ntS4) before the predefined rotational speed threshold (ntS3), and discontinuing the engagement process of the positively interlocking shifting element (F) from the disengaged operating condition, if the timer reaches a predetermined value.

2. The method according to claim 1, further comprising the step of discontinuing the engagement process of the positively interlocking shifting element (A, F), if, before reaching the synchronous rotational speed (nt("4")), the variation of the rotational speed (nt) of the transmission input shaft (2) or the rotational speed of the component that is equivalent to the rotational speed of the transmission input shaft equals an additional rotational speed threshold (ntS1) without an actuation of the positively interlocking shifting element (A, F) to engage having been commanded.

3. The method according to claim 2, further comprising the step of determining a time point (T4) before reaching the synchronous rotational speed (nt("4")), from which actuation of the positively interlocking shifting element (F) must be started so as to engage the positively interlocking shifting element, and discontinuing the engagement process of the positively interlocking shifting element (F) if the variation of the rotational speed (nt) of the transmission input shaft or the rotational speed of the component that is equivalent to the rotational speed of the transmission input shaft equals the additional predefined rotational speed threshold (ntS1) at a time (T9) which is earlier than a start time determined for starting the actuation of the positively interlocking shifting element (F) in the engaging direction.

4. The method according to claim 2, further comprising the step of actuating the positively interlocking shifting element (F) to engage if the variation of the rotational speed (nt) of the transmission input shaft (2) or the rotational speed of the component that is equivalent to the rotational speed of the transmission input shaft equals an additional further predefined rotational speed threshold (ntS2), which the rotational speed (nt) of the transmission input shaft (2) or the rotational speed of the component that is equivalent to the rotational speed of the transmission input shaft reaches before the additional predefined rotational speed threshold (ntS1).

5. The method according to claim 1, further comprising the step of, once the engagement process of the positively interlocking shifting element (F) has been discontinued, changing the transmission device (1) to a safe operating condition in which both the transmission input shaft (2) and the transmission output shaft (3) are rotatable.

6. The method according to claim 5, further comprising the step of defining the safe operating condition of the transmission device (1) as a neutral operating condition in which the force flow between the transmission input shaft (2) and the transmission output shaft (3) is interrupted.

7. The method according to claim 5, further comprising the step of correlating the safe operating condition to the operating condition of the transmission device (1) before a command to engage the positively interlocking shifting element (F).

8. A method of operating a transmission device (1) which can be changed to various operating conditions by actuating shifting elements (A to F), at least one of the shifting elements (A, F) is a positively interlocking shifting element which, in order to obtain at least one of the various operating conditions of the transmission device (1) during which a force flow exists between a transmission input shaft (2) and a transmission output shaft (3), has to be changed to an engaged operating condition, the method comprising the steps of:

initiating an engagement process to engage the positively interlocking shifting element;

varying a rotational speed (nt) of the transmission input shaft (2) or a rotational speed of a component that is equivalent to the rotational speed of the transmission input shaft toward synchronous rotational speed (nt("4")) which is produce in the engaged operating condition of the positively interlocking shifting element (F), and the synchronous rotational seed being determined at least as a function of a rotational speed of the transmission output shaft (3);

after reaching the synchronous rotational speed (nt("4")), discontinuing the engagement process of the positively interlocking shifting element (F) from a disengaged operating condition, if the variation of the rotational speed (nt) of the transmission input shaft (2) or the rotational speed of the component that is equivalent to the rotational speed of the transmission input shaft equals a predetermined rotational speed threshold (ntS3); and     varying at least one of the rotational speed threshold (ntS3), a further rotational speed threshold (ntS4), an additional rotational speed threshold (ntS1) and an additional further rotational speed threshold (ntS2) as a function of an operating temperature of the transmission device (1).

9. A method of operating a 9-gear transmission device (1) which has a plurality of actuating shifting elements, at least one of the actuating shifting elements is a positively interlocking shifting element which is engaged in a flow of force between a transmission input shaft (2) and a transmission output shaft (3) to implement at least one defined operating condition of the transmission device (1), the method comprising the steps of:

initiating an engagement process to engage the positively interlocking shifting element;

adjusting a rotational speed (nt) of the transmission input shaft (2) toward a synchronous rotational speed of the positively interlocking shifting element (A, F) as a function of a rotational speed of the transmission output shaft (3);

after achieving the synchronous rotational speed in the positively interlocking shifting element, discontinuing the engagement process of the positively engaging shifting element (F) from a disengaged operating condition, if the variation of the rotational speed (nt) of the transmission input shaft (2) equals a predetermined rotational speed threshold (ntS3); and     varying the predetermined rotational speed threshold (ntS3), a further rotational speed threshold (ntS4), an additional rotational speed threshold (ntS1) and an additional further rotational speed threshold (ntS2) as a function of a gradient of a variation of a difference between the current rotational speed (nt) of the transmission input shaft (2) and the synchronous rotational speed (nt("4")) of the transmission input shaft (2) or of the rotational speed of the component that is equivalent to the rotational speed of the transmission input shaft.

\* \* \* \* \*